(12) United States Patent
Jin et al.

(10) Patent No.: US 11,985,912 B2
(45) Date of Patent: May 21, 2024

(54) WEEDING DEVICE FOR CROPS HAVING SEEDLING AVOIDANCE FUNCTION

(71) Applicant: Henan University of Science and Technology, Luoyang (CN)

(72) Inventors: Xin Jin, Luoyang (CN); Hengyi Zhang, Luoyang (CN); Hongbin Suo, Luoyang (CN); Xiaowu Zhu, Luoyang (CN); Mengnan Liu, Luoyang (CN); Yirong Zhao, Luoyang (CN); Bo Zhao, Luoyang (CN)

(73) Assignee: Henan University of Science and Technology, Luoyang (CN)

( * ) Notice: Subject to any disclaimer, the term of this patent is extended or adjusted under 35 U.S.C. 154(b) by 0 days.

(21) Appl. No.: 18/518,008

(22) Filed: Nov. 22, 2023

(65) Prior Publication Data

US 2024/0081165 A1 Mar. 14, 2024

Related U.S. Application Data

(63) Continuation-in-part of application No. PCT/CN2023/093646, filed on May 11, 2023.

(30) Foreign Application Priority Data

May 26, 2022 (CN) .......................... 202210581886.8

(51) Int. Cl.
*A01B 63/00* (2006.01)
*A01B 39/18* (2006.01)

(52) U.S. Cl.
CPC ............ *A01B 63/008* (2013.01); *A01B 39/18* (2013.01)

(58) Field of Classification Search
CPC ........... A01B 1/18; A01B 21/02; A01B 39/18; A01B 63/023; A01B 63/045; A01B 63/008; A01B 73/044
See application file for complete search history.

(56) References Cited

U.S. PATENT DOCUMENTS 266,956 A * 10/1882 Fuller .................... A01B 39/18
56/400.14
3,760,885 A * 9/1973 McKenzie ........... A01B 13/025
172/686
(Continued)

FOREIGN PATENT DOCUMENTS

CN 107172895 A 9/2017
CN 107912089 A 4/2018
(Continued)

OTHER PUBLICATIONS

China National Intellectual Property Administration, First Office Action in Patent Application No. CN202210581886.8 issued on Jan. 5, 2023, which is a foreign counterpart application corresponding to this U.S. Patent Application, to which this application claims priority.

(Continued)

*Primary Examiner* — Jessica H Lutz
(74) *Attorney, Agent, or Firm* — Kolitch Romano Dascenzo Gates LLC

(57) ABSTRACT

A weeding device for crops having a seedling avoidance function includes a rack connected to a weeding machine. A hydraulic pump and two hydraulic cylinders are mounted to the rack. Bottom ends of each of the two hydraulic cylinders are provided with a vertically arranged support rod. An inter-row weeder is mounted to a bottom end of each of the two support rods. A slider configured to reciprocate in a horizontal direction is positioned on two slide rails that are mounted to the rack. An inter-plant weeder is mounted to a bottom side of the slider. A plurality of weeder blades are arranged side by side on the inter-plant weeder. At the weeding position, an arrangement direction of weeder blades is perpendicular to an advancing direction, and at the weed avoidance position, the arrangement direction of the (Continued)

weeder blades is parallel to the advancing direction, thereby avoiding crops.

5 Claims, 4 Drawing Sheets

(56) References Cited

U.S. PATENT DOCUMENTS

| | | | |
|---|---|---|---|
| 5,394,945 A | 3/1995 | Desmarais | |
| 5,915,481 A * | 6/1999 | Flenker | A01B 63/32 |
| | | | 172/569 |
| 6,935,435 B1 * | 8/2005 | Shenk | A01B 39/14 |
| | | | 172/600 |
| 11,627,693 B2 * | 4/2023 | Ertl | A01B 13/06 |
| | | | 172/311 |

FOREIGN PATENT DOCUMENTS

| | | | |
|---|---|---|---|
| CN | 210746077 U | 6/2020 | |
| CN | 212184863 U | 12/2020 | |
| CN | 112806115 A | 5/2021 | |
| CN | 113287378 A | 8/2021 | |
| CN | 113597996 A * | 11/2021 | |
| CN | 114009417 A | 2/2022 | |
| CN | 114946815 A | 8/2022 | |
| EP | 3918895 A1 * | 12/2021 | A01B 69/001 |
| JP | 2009033981 U | 2/2009 | |

OTHER PUBLICATIONS

Notification to Grant Invention Patent Right for Chinese Patent Application No. CN202210581886.8 issued on Mar. 23, 2023.

* cited by examiner

WEEDING DEVICE FOR CROPS HAVING SEEDLING AVOIDANCE FUNCTION

CROSS-REFERENCE TO RELATED APPLICATION

This application is a continuation-in-part application of International Application No. PCT/CN2023/093646, filed on May 11, 2023, which claims the priority of Chinese Application No. 202210581886.8, filed on May 26, 2022, both of which are incorporated by reference herein.

TECHNICAL FIELD

The present disclosure relates to the field of weeding devices, and in particular, to a weeding device for crops having a seedling avoidance function.

BACKGROUND

Weeding is an indispensable part in agricultural production activities. Weeds compete with crops for growth resources, which may lead to crop yield reduction. Herbicide weeding is a widely used weeding method at present, but the residue of herbicide may harm human and animals, and long-term use of the same herbicide may cause "drug resistance" of some weeds. In addition, the residue of herbicides may also cause ecological environmental pollution. Therefore, in the prior art, mechanical weeding is adopted in which a plurality of weeders are usually mounted in the front of a weeding machine. At present, the inter-row mechanical weeding technology has been well applied, but the inter-plant mechanical weeding technology develops slowly, that is, the weeder of the existing weeding device is usually located between two adjacent rows of crops, which can effectively remove weeds between two adjacent rows of crops, but it is difficult to effectively remove weeds between adjacent crops in the same row or it may easily damage crops.

SUMMARY

In order to solve a problem that the existing weeding device is difficult to remove weeds between adjacent crops in the same row, the present invention provides a weeding device for crops having a seedling avoidance function.

The technical solution adopted by the present invention for solving the technical problem is as follows. A weeding device for crops having a seedling avoidance function is provided, including a rack connected to a weeding machine. A bottom side of the rack is provided with a wheel assembly. A hydraulic pump and two hydraulic cylinders are mounted to the rack. Bottom ends of the two hydraulic cylinders are each provided with a support rod. The two support rods are vertically arranged. An inter-row weeder is mounted to a bottom end of each of the two support rods. The wheel assembly includes two wheels and an axle. The wheel assembly is respectively connected to the two support rods, so that the two hydraulic cylinders cooperate to adjust a height of the rack relative to the wheel assembly. Two slide rails are mounted to the rack. A slider configured to reciprocate in a horizontal direction is mounted to each of the two slide rails. An inter-plant weeder is mounted to a bottom side of the slider. A plurality of weeder blades are arranged side by side on the inter-plant weeder. The slider is configured to drive the inter-plant weeder to move from a weeding position between the two support rods to a seedling avoidance position outside the two support rods.

In some embodiments, at the weeding position, an arrangement direction of the plurality of weeder blades is perpendicular to an advancing direction of the weeding machine, and at the seedling avoidance position, the arrangement direction of the plurality of weeder blades is parallel to the advancing direction of the weeding machine.

In some embodiments, an electric control box is mounted to a side of the rack, and a sensor configured to detect crops in front is further mounted to the rack.

According to the foregoing technical solution, the weeding device of the present disclosure has the following beneficial effects.

The weeding device of the present disclosure is simple in structure and design, and the height of the rack can be adjusted through the hydraulic pump and the hydraulic cylinder. In addition, the inter-row weeder and the inter-plant weeder are provided. When the weeding device runs with a weeding machine, the inter-row weeder moves between two adjacent rows of crops to remove weeds between the rows, and the inter-plant weeder moves between lines of crops in the same row. When a crop or a seedling is encountered, the inter-plant weeder can move from the weeding position to the seedling avoidance position, thereby avoiding crops. In this way, the seedling avoidance function is realized, and weeds between adjacent crops in the same row can be effectively removed without damaging crops, which overcomes the problems that the existing weeding device is difficult to weed between plants.

DETAILED DESCRIPTION

With reference to the accompanying drawings, the embodiments of the present disclosure are described.

In some agricultural practices, crop fields are divided into a plurality of rows where the plant are sown and grow, and the unsown space between the rows. In each row, crops are sown along lines separated each other and crops grows in lines. But some seeds may be fallen between the lines during sowing, and thus some seedlings grow between the lines. It is desired to have a weeding device that can remove the weeds between the rows and the weeds between lines of crops while avoiding removing the seedling between the lines. In the present disclosure, the term "crops" and "seedlings" may be used interchangeably.

Figure 1:
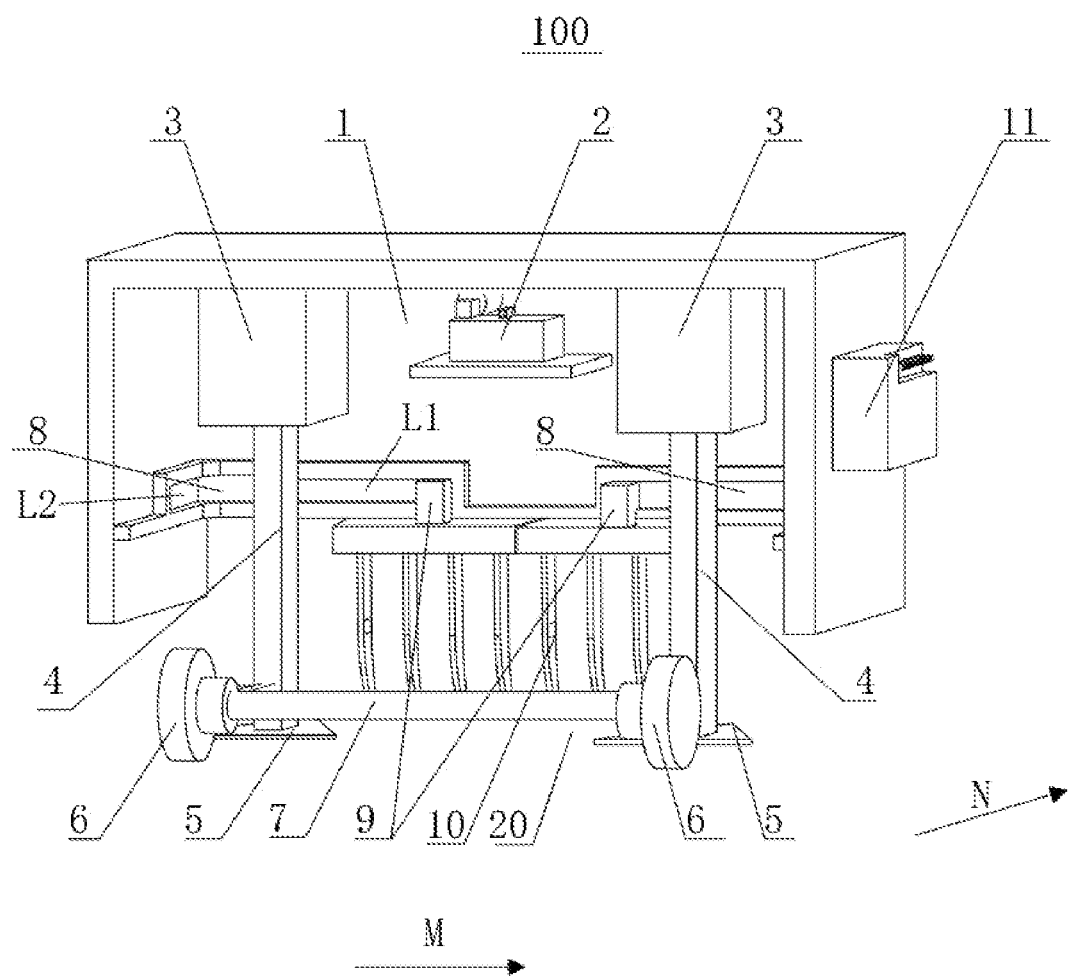
FIG. 1 is a schematic diagram of an inter-plant weeder at a weeding position according to one embodiment of the present disclosure.
Figure 2:
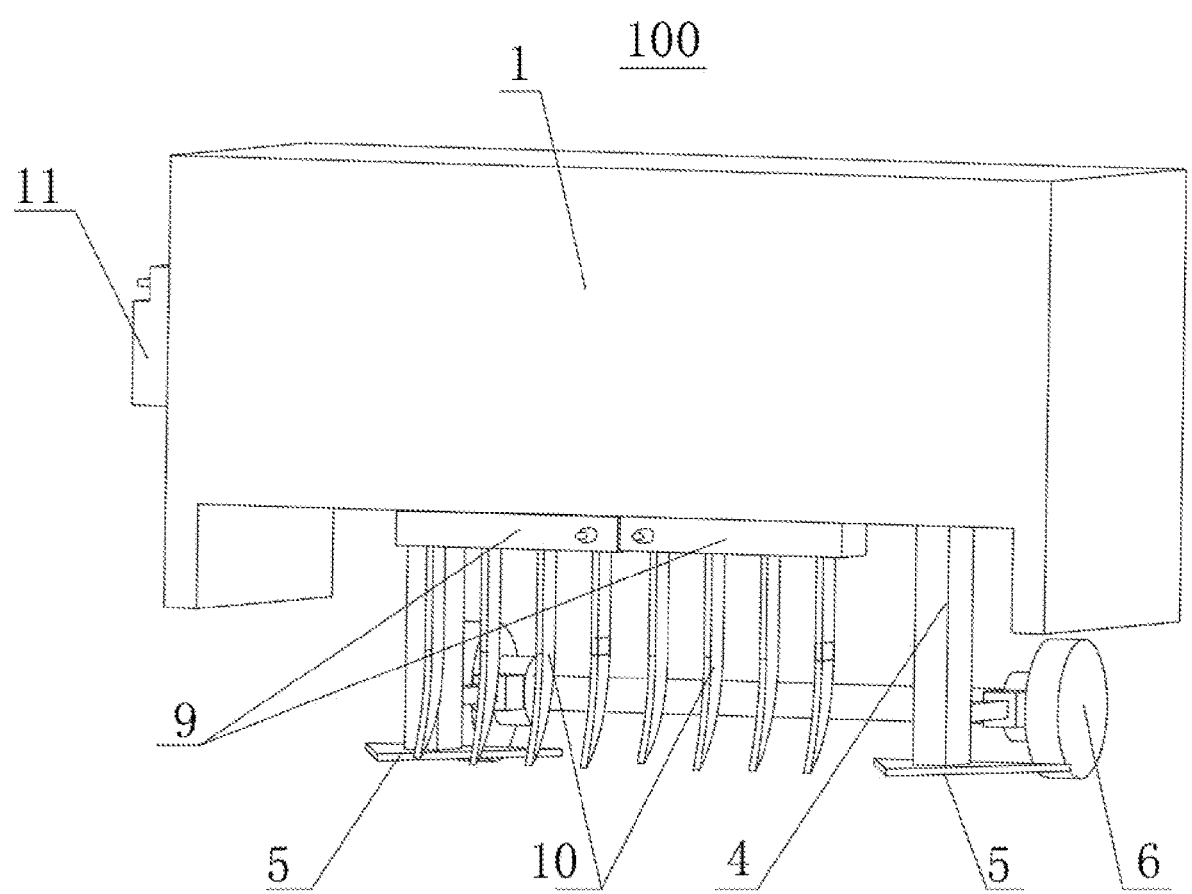
FIG. 2 is a schematic diagram of FIG. 1 of the inter-plant weeder from another perspective view.

FIG. 1 is a schematic diagram of a perspective view of a weeding device at a weeding position according to one embodiment of the present disclosure, and FIG. 2 is a schematic diagram of an weeding device of FIG. 1 from another perspective view. As shown in FIG. 1 and FIG. 2, a weeding device 100 for crops has a seedling avoidance function. The weeding device 100 includes a rack 1 connected to a body of a weeding machine (not shown). In some embodiments, the weeding machine may be a vehicle driven by an energy source to move in the crop field. The weeding device 100 may be positioned in a front the weeding machine. In some embodiments, the weeding device 100 may be moveably connected to the body of the weeding machine and configured to move up and down relative to a ground while moving with the weeding machine. A bottom side of the rack 1 is provided with a wheel assembly 20, a hydraulic pump 2 and two hydraulic cylinders 3 are mounted to the rack 1. In some embodiments, the two hydraulic cylinders 3 are mounted to a top wall of the rack 1, and bottom ends of the two hydraulic cylinders 3 are each provided with a support rod 4. The two support rods 4 are vertically arranged and substantially parallel each other, and an inter-row weeder 5 is mounted to a bottom end of each of the two support rods 4. The wheel assembly 20 includes two wheels 6 and an axle 7, and the wheel assembly 20 is respectively connected to the two support rods 4, so that the two hydraulic cylinders 3 cooperate to adjust a height of the rack 1 relative to the wheel assembly 20. During an operation of the weeding machine, the wheels 6 touch the ground, and moves on the ground with the weeding machine.

In some embodiments, the inter-row weeder 5 is a weeder knife with a main plane substantially perpendicular to the support rod 4 or substantially parallel to the ground. In some embodiments, the weeder knife's main plane may form an angle with the ground. The two support rods 4 are configured such that, in the use position, the two inter-row weeder 5 are positioned between the two adjacent rows of corps. When the weeding device 100 moves with the weeding machine, the inter-row weeder 5 moves between two adjacent rows of crops to remove weeds between the two adjacent rows.

In some embodiments, the rack 1 may include a top wall, two side walls and at least one base wall connecting the two side walls. Two slide rails 8 are mounted to the rack 1. Each slide rail 8 is an L-shaped bent structure, and mounted horizontally. The slide rail 8 includes a first section L1 and a second section L2. The first section L1 is formed on an inner side of the base wall, and the second section L2 is formed on an inner side of a side wall. The first section L1 may be substantially perpendicular to the second section L2. In some examples, the slide rail 8 further includes a connecting section connecting the first section L1 and the second section L2 to facilitate the translation of the slider 9 from the first section L1 to the second section L2. The connecting section is a curved section. A slider 9 is provided in each of the slide rail 8. The slider 9 includes a sliding portion located in the slide rail 8. The sliding portion is configured to be moveable horizontally inside the each of the two slide rails 8.

An inter-plant weeder 10 is mounted to a bottom side of the slider 9, a plurality of weeder blades are arranged side by side on the inter-plant weeder 10, and the slider 9 is configured to drive the inter-plant weeder 10 to move from a weeding position between the two support rods 4 to a weed avoidance position or a seedling avoidance position outside the two support rods 4. In some embodiments, the inter-plant weeder 10 is mounted to the mount portion of the slider 9. In some embodiments, the weeder blades are elongated blades, extend from a mount portion of the slider 9, and are spaced apart each other at a preset distance. The preset distance is set such that the blades are positioned between adjacent lines of crops or plants in the row. The slider 9 is connected to a motor (not shown) and is configured to be driven by the motor. The motor is connected to a controller (not shown) such that the controller can control the motor to drive the slider 9.

Figure 3:
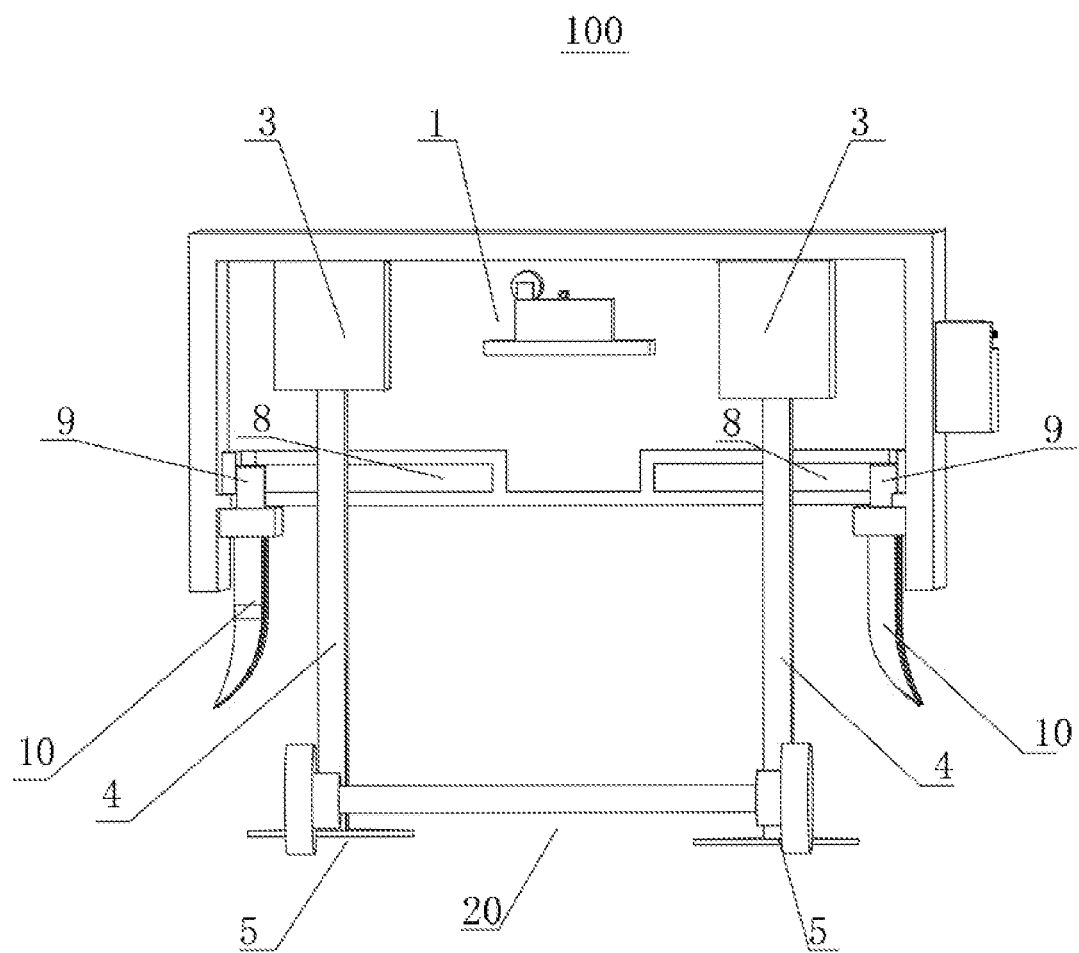
FIG. 3 is a schematic diagram of the inter-plant weeder at a weed avoidance position according to one embodiment of the present disclosure.

In some embodiments, each of the slide rails 8 is an L-shaped bent structure, the weeding position and the weed avoidance position are respectively located on two sections of the L-shaped bent structure perpendicular to each other, at the weeding position, an arrangement direction of the plurality of weeder blades is perpendicular to an advancing direction of the weeding machine, and at the weed avoidance position, the arrangement direction of the plurality of weeder blades is parallel to the advancing direction of the weeding machine. Referring to FIG. 1 and FIG. 3, FIG. 1 shows that the inter-plant weeder 10 is at a weeding position wherein the inter-plant weeder 10 is located between the two support rods 4, and FIG. 3 shows that the inter-plant weeder 10 is at a seedling avoidance position where the inter-plant weeder 10 is located outside the two support rods 4. The slider 9 is configured to drive the inter-plant weeder 10 to move from the weeding position to the seedling avoidance position. As shown in FIG. 1, at the weeding position, the sliding portion of slider 9 is positioned in the first section L1 of the slide rail 8, and an arrangement direction M of the plurality of weeder blades is perpendicular to an advancing direction N of the weeding machine. The arrangement direction M is the direction along which the plurality of blades are arranged. At the seedling avoidance position shown in FIG. 3, the slider 9 is positioned in section L2 of the slide rail 8, and the arrangement direction M of the plurality of weeder blades is parallel to the advancing direction N of the weeding machine.

In some embodiments, as shown in FIGS. 1, 2 and 3, an electric control box 11 is mounted to a side of one side wall of the rack 1. The electric control box 11 may include a controller 102 as described in detail below. A sensor is further mounted on the rack 1 to detect crops in front. The sensor may be mount at a front of the rack 1 or at any appropriate position at the rack 1 where the view in front of the weeding device 100 can be sensed when the weeding machine is moving. In one example, the sensor may be an image sensor that can capture the images in front of the weeding device 100. In other examples, the sensor may be an ultrasonic sensor that use sound waves to detect objects, or the sensor may be a photoelectric sensor that involves transmitting a beam of light and detecting the object based on the reflected light. Any appropriate sensors that can detect an object, detect a distance between the sensor and the object, and/or detect a height of an object may be used.

Figure 4:
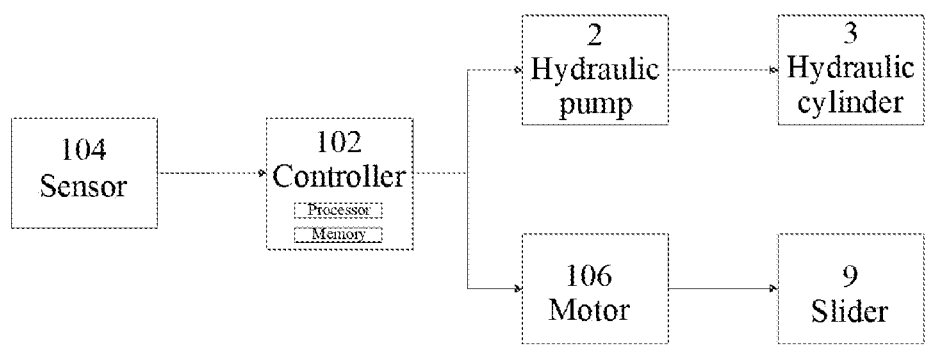
FIG. 4 is a schematic block diagram illustrating connections among some components of a weeding device according to one embodiment of the present disclosure.

FIG. 4 is a schematic block diagram showing connections among some components of the weeding device 100. As shown in FIG. 4, the controller 102 communicate with the sensor 104, the hydraulic pump 2 and the motor 106 to control the hydraulic pump 2 move the hydraulic cylinder 3 and to control the motor 106 to move slider 9, respectively. The controller 102 may include a processor and memory configured to store instructions executed by the processor. The processor is configured to execute the instructions to control the hydraulic pump 2 and the motor 106. As shown in FIG. 4, the controller 102 receives information from sensor 104. In some examples, the controller 102 is configured to process the information from the sensor 104. For example, the controller 102 may be configured to recognize the crops/seedlings and determined a distance between the weeding device and the crops/seedlings such that the controller is capable of controlling the hydraulic pump 2 and the motor 106 take corresponding actions. In another example, the sensor 104 may detect a height of an object and a distance between the weeding device and the crops/seedlings and the controller may determine whether there is corps/seedlings at front and the distance between the weeding device and corps/seedlings, and control hydraulic pump 2 and the motor 106 take actions accordingly.

In some embodiments, when the weeding machine is moving and the sensor detects that a distance of a target crop reaches a preset value, the controller 102 causes the hydraulic pump 2 to drive the two hydraulic cylinders 3 to extend, so that the height of the rack 1 relative to the wheel assembly is increased to a preset height. In some embodiments, the preset height is 50 mm. Then, the two sliders 9 driven by the motor respectively move in the two slide rails 8 so that the inter-plant weeder 10 moves from the weeding position illustrated in FIG. 1 to the seedling avoidance position illustrated in FIG. 3, and the arrangement direction M of a plurality of weeder blades is changed from being perpendicular to the advancing direction of the weeding machine to being parallel to the advancing direction of the weeding machine. In the seedling avoidance position shown in FIG. 3, the inter-plant weeder 10 is lifted further away from the ground, and is located outside the support rod 4. In the embodiment illustrated in FIG. 3, the inter-plant weeder 10 is located away from the inter-row weeder 5 at the seedling avoidance position. That is, the inter-plant weeder 10 may be configured to be positioned between two adjacent rows of crops at the seedling avoidance position and not in the row, so that the crops in front of the weeding device in the row of the crops can be avoided. When the weeding device passes through the crops, the slider 9 moves in an opposite direction, then the two hydraulic cylinders 3 retract, and the inter-plant weeder 10 is restored to the state of a normal operation of removing the weeds between the lines of crops.

The invention claimed is:

1. A weeding device, comprising:
  a rack connected to a weeding machine, wherein a bottom side of the rack is provided with a wheel assembly, wherein a hydraulic pump and two hydraulic cylinders are mounted to the rack, wherein bottom ends of the two hydraulic cylinders are each provided with a support rod, two support rods are vertically arranged, wherein the wheel assembly comprises two wheels and an axle, and the wheel assembly is respectively connected to the two support rods, and wherein the two hydraulic cylinders are configured to cooperate to adjust a height of the rack relative to the wheel assembly, wherein two slide rails are mounted on the rack, and each of the slide rails is an L-shaped structure having a first section mounted on a base wall of the rack and second section mounted on a side wall of the rack, and the base wall is substantially perpendicular to the side wall;
  an inter-row weeder mounted to a bottom end of each of the two support rods, wherein the inter-row weeder is configured to be located in a space between two adjacent rows of crops;
  a slider moveably connected to the each of the two slide rails and configured to move horizontally in the each of the two slide rails, wherein the slider includes a sliding portion located in the slide rail and a mount portion connected to a bottom of the sliding portion, the mount portion extends in a horizontal direction, and is substantially parallel to the axle; and
  an inter-plant weeder mounted to the mounting portion of the slider, wherein the inter-plant weeder includes a plurality of weeder blades arranged side by side at a preset distance along an arrangement direction and extending from the mounting portion of the slider;
  wherein the slider is configured to drive the inter-plant weeder to move from a weeding position to a seedling avoidance position, wherein at the weeding position, the plurality of weeder blades of the inter-plant weeder are located between the two support rods, and the arrangement direction of the plurality of weeder blades of the inter-plant weeder is perpendicular to an advancing direction of the weeding machine, and wherein at the seedling avoidance position, the plurality of weeder blades of the inter-plant weeder are located outside the two support rods, and the arrangement direction of the plurality of weeder blades the inter-plant weeder is parallel to the advancing direction of the weeding machine.

2. The weeding device according to claim 1, further comprising:
  a sensor mounted on the rack and configured to detect a crop in front and a distance between the crop and the weeding device;
  a motor configured to drive the slider; and
  a controller configured to receive information from the sensor and control operations of the hydraulic pump to drive the two hydraulic cylinders and the motor to drive the slider in response to the information from the sensor.

3. The weeding device according to claim 1, wherein the inter-row weeder is a weeder knife with a main plane substantially perpendicular to the support rod.

4. The weeding device according to claim 1, wherein the plurality of weeder blades of the inter-plant weeder are elongated blades, and the preset distance is set such that the plurality of weeder blades of the inter-plant weeder are positioned between adjacent lines of crops at the weeding position.

5. The weeding device according to claim 1, wherein the first section and the second section of the slide rails are substantially perpendicular.

* * * * *